United States Patent

Kikuchi et al.

[11] Patent Number: 4,990,806
[45] Date of Patent: Feb. 5, 1991

[54] PULSE MOTOR

[75] Inventors: Hiroshi Kikuchi; Jiro Tanuma; Tadashi Kasai; Masayuki Ishikawa, all of Tokyo, Japan

[73] Assignee: Oki Electric Industry Co., Ltd., Tokyo, Japan

[21] Appl. No.: 350,721

[22] Filed: Apr. 27, 1989

[30] Foreign Application Priority Data

May 10, 1988 [JP] Japan .................................. 63-11473

[51] Int. Cl.⁵ .......................................... H02K 37/14
[52] U.S. Cl. .................................. 310/49 A; 310/192; 310/49 R
[58] Field of Search ............... 310/12, 190, 192, 49 A, 310/49 R

[56] References Cited

U.S. PATENT DOCUMENTS 3,502,923  3/1990  Howell ............................ 310/192
4,475,091 10/1984  Chai et al. ...................... 310/190

Primary Examiner—Steven L. Stephan
Assistant Examiner—Judson H. Jones
Attorney, Agent, or Firm—Spencer & Frank

[57] ABSTRACT

In a pulse motor comprising a rotor, a drive coil excited by a predetermined drive current to drive the rotor, and a yoke for guiding a magnetic flux generated by the drive coil to a predetermined magnetic path; the yoke is provided with an aperture to restrict the flow path of an eddy current induced by the magnetic flux generated by the drive coil.

13 Claims, 6 Drawing Sheets

DRIVE PULSE NUMBER PER SECOND [pps]

PULSE MOTOR

BACKGROUND OF THE INVENTION

The present invention relates to a pulse motor frequently used in printers and the like.

In printers, for example, a pulse motor (stepping motor) having a good controllability is often employed for scanning a print head, or driving a platen roll.

FIG. 2 shows an exploded oblique view of a prior-art pulse motor using a permanent magnet for the rotor.

The rotor 1 of this pulse motor comprises a permanent magnet divided and magnetized along its circumference. A rotor shaft 2 is fixed to the center of the rotor 1 by means of a collar, not shown. Provided to surround the rotor 1 are a pair of drive coils 3 and 4, and inner yokes 5 and 6 are disposed between the drive coils 3 and 4. Provided to surround the drive coils 3 and 4 are outer yokes 7 and 8. A flange 9 and a mounting plate 11 are provided at the top and at the bottom. The flange 9 is provided with a bearing 10 for accepting and supporting the rotor shaft 2. The mounting plate 11 is provided with a similar bearing, although not illustrated as such.

The two yokes 5 and 6 comprise annular magnetic plates 5a and 6a, respectively, and are provided, at their inner peripheries, n/4 (n being the number of steps per rotation of the rotor) magnetic poles 5b and 6b, respectively, formed by bending so that they are parallel with the rotor shaft 2. In the drawings, the magnetic poles 5b of the inner yoke 5 are shown to be bent upward. The magnetic poles 6b of the inner yoke 6 are bent downward. The magnetic poles 5b of the inner yoke 5 and the magnetic poles 6b of the inner yoke 6 are arranged so that their phases are 90° offset relative to each other.

Magnetic poles of the same shape are provided in the same number on the lower surface of the outer yoke 7 and the upper surface of the outer yoke 8. Magnetic poles, not shown, on the outer yoke 7 are provided to confront the magnetic poles 5b on the inner yoke 5 so that their phases are 180° offset relative to each other. Similarly, the magnetic poles 23 on the outer yoke 8 are provided to confront the magnetic poles 6b on the upper yoke 6 so that their phases are 180° offset relative to each other. The drive coils 3 and 4 are of such a configuration that the coil 14 or 16 are wound on the bobbins 13 and 15.

The outer yoke 7, the flange 9, and the outer yoke 8 and the mounting plate 11 are secured by spot welding or the like. The inner yokes 5 and 6 and the outer yokes 7 and 8 are stacked so as to surround the rotor 1, and the outer yokes 7 and 8 are fitted over the bobbins 13 and 15. The assembly is thus completed.

In the pulse motor of the above construction, when predetermined alternating currents with their phases offset relative to each other are supplied to the drive coils 3 and 4, the rotor 1 rotates at the corresponding period. The magnetic flux generated by the drive coil 3 passes through the magnetic poles 5b of the inner yoke 5, passes from the central portion of the inner yoke 5 to the outer portion, and passes through the outer periphery of the outer yoke 7, and then through the top surface toward the bearing 10, and then through the magnetic poles, not shown, on the lower surface of the outer yoke 7, and then across the air gap, and then enters the rotor 1. The magnetic flux then passes across an air gap and returns to the magnetic poles of the inner yoke 5. A similar magnetic path is formed for the drive coil 4, with the inner yoke 6 and the outer yoke 8 being included in the path.

The rotor 1 is driven in such a direction that the magnetic paths are shortened. By supplying the drive coils 3 and 4, with alternating currents with their phases 90° relative to each other, a continuous drive force of 4 steps per period of the alternating currents are derived and the rotor 1 is thereby rotated.

In recent years, size reduction, cost reduction and improvement in performance are required in connection with printers and the like, and attendantly the pulse motors used in these equipment are required to be of smaller size, lower cost have a higher torque and higher rotational speed.

An attempt has been made to increase the torque without increasing the outer dimension of the motor itself by using rare earth magnets in place of conventional ferrite magnets for the rotor 1. But then the low-price feature of the permanent magnet type pulse motor using permanent magnets for the rotor would be lost.

Another attempt to increase the torque is to increase the current flowing through the drive coils up to their rating. But then the problem of heat generation in the pulse motor itself or the drive circuit occurs. A countermeasure is to provide a heat sink, cooling fans or the like for the pulse motor or the drive circuit to increase the cooling efficiency. This then raises the cost, and the size of the motor and the peripheral circuits. A further attempt made was to optimize the parameters, such as coil constants and the drive currents, to maximize the output with the limited outer dimension. But this also has a limitation.

SUMMARY OF THE INVENTION

An object of the present invention is to provide a pulse motor in which the heat generation of the yoke is prevented and the drive efficiency is increased.

A pulse motor according to the invention comprises: a rotor; a drive coil excited by a predetermined drive current to drive the rotor; and a yoke for guiding the magnetic flux generated by the drive coil to a predetermined magnetic path; wherein the yoke is provided with a through-hole to restrict the flow path of an eddy current induced by the magnetic flux generated by said drive coil.

In the above pulse motor, the provision of the through-hole in the yoke obstructs the flow of the eddy current induced by the magnetic flux generated by the drive coil. For instance, a slit intercepting the flow path of the eddy current will reduce the heat generation substantially. If several through-holes are provided in the yoke, being arranged in such a manner so as to increase the effective electrical resistance of the flow path for the eddy current, the eddy current can be reduced. The eddy current is reduced in this way, and the heat generation in the yoke is reduced, and the efficiency of the motor can be improved.

DETAILED DESCRIPTION OF THE EMBODIMENTS

An embodiment of the invention will now be described with reference to the drawings.

Figure 1:
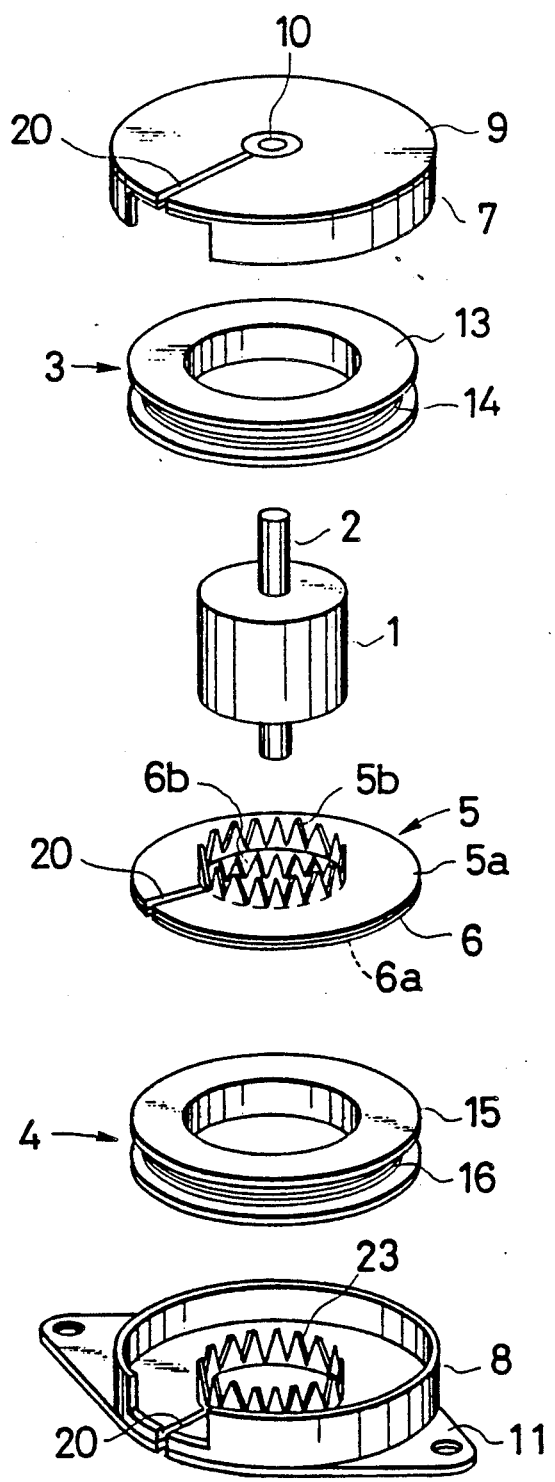
FIG. 1 is an exploded oblique view showing an embodiment of the pulse motor according to the invention.

FIG. 1 is an exploded oblique view of an embodiment of a pulse motor according to the invention.

This motor comprises a rotor 1, yokes 5 and 6 surrounding the rotor 1, drive coils 3 and 4, outer yokes 7 and 8, a flange 9 and a mounting plate 11. The construction of the rotor 1, and the drive coils 3 and 4 is the same as that of the prior-art pulse motor described with reference to FIG. 2.

In the pulse motor according to the invention, the inner yokes 5 and 6, and the outer yokes 7 and 8 are each provided with a slit 20 extending radially. The flange 9 and the mounting plate 11 are similarly provided with a slit 20. Except that these slits 20 are provided, the construction of the inner yokes 5 and 6, and the outer yokes 7 and 8 is identical to that of the prior-art pulse motor described with reference to FIG. 2. So the identical parts are denoted by identical reference marks and their description will be omitted. Specific description of the slits 20 will now be given.

Figure 3:
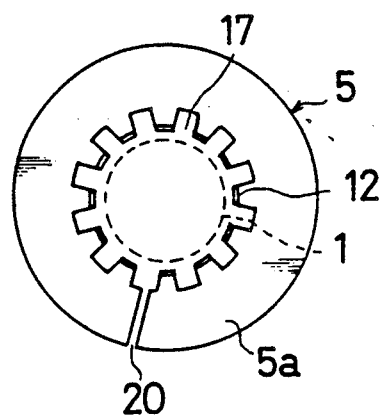
FIG. 3 is a top view showing an embodiment of an inner yoke used in the motor of the invention.

FIG. 3 is a top view of an embodiment of the inner yoke 5 used in the motor shown in FIG. 1.

The inner yoke 5 comprises an annular magnetic plate 5a, as was explained earlier, and is provided with a through-hole 17 in the center which permits insertion of the rotor 1. The magnetic poles 5b are arranged around the through-hole 17, at as regular pitch with a predetermined spacing between them. A slit 20 is provided to extend from the through-hole 17 radially up to the outer periphery. The inner yoke 6 shown in FIG. 1 has a similar construction. The slits are formed at an appropriate interval portion between magnetic poles 5b and 6b adjacent to each other, avoiding the magnetic poles necessary for the formation of the magnetic path for the motor drive. Each of the outer yokes 7 and 8 has a similar slit.

Figure 4:
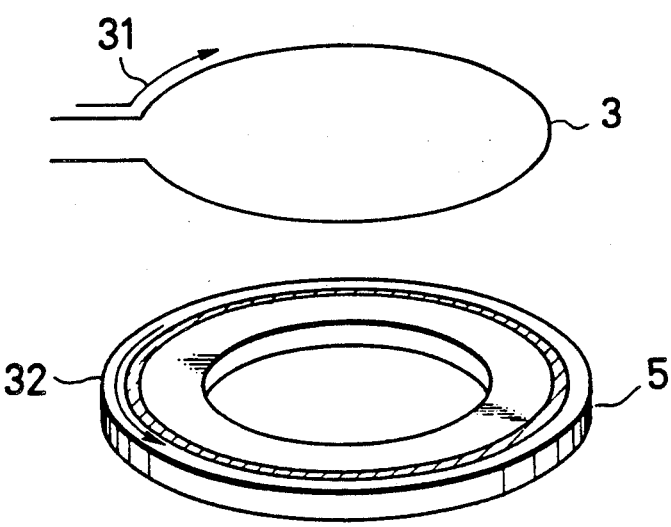
FIG. 4 is a diagram showing the functions of the eddy current generated in the yoke.

The reason why a slit-shaped through-hole is provided in each yoke is as follows:

FIG. 4 is a diagram for explaining the functions of the eddy current generally generated in the yoke 5.

For instance, the drive coil 3 is provided coaxially with and above the yoke 5. The drive coil 3 is supplied with an exciting current in the direction of the arrow 31. The exciting current 31 is an alternating current. The magnetic flux which penetrates the yoke 5 alternates at the same period as the period of the alternating current. As a result, an eddy current is generated in the yoke 5 in the direction of the arrow 32. The yoke 5 is formed of a magnetic material, and has a certain electrical conductivity, so it provides a short-circuiting path for the eddy current 32. As a result, a relatively large current flows and the yoke 5 is heated. Although eddy currents along minor loops are also formed they are negligible compared with the eddy current 32.

When a slit 20 is provided to intercept the flow path for the eddy current as shown in FIG. 3, the heat generation can be reduced. When a pulse motor is driven at a high speed, the drive current is an alternating current of a high frequency. Since the eddy current loss is proportional to the square of the frequency, the prevention of the eddy current as described above is effective in prevention of the heat generation and improvement of the efficiency.

Figure 2:
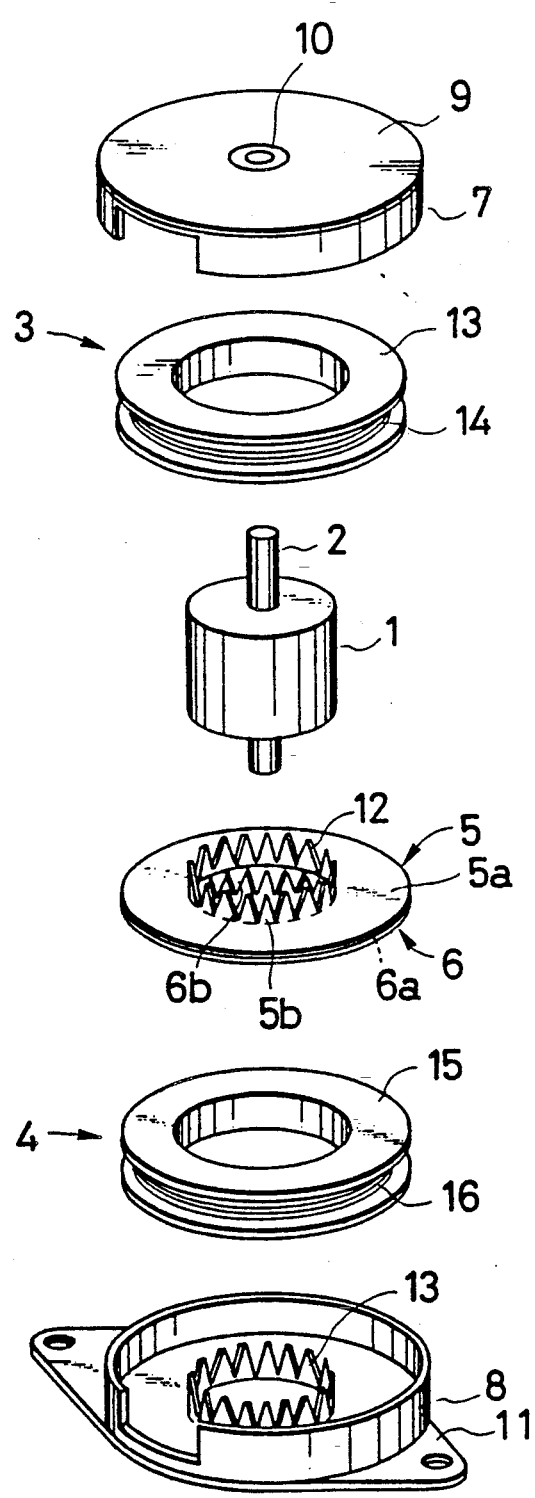
FIG. 2 is an exploded oblique view shown a prior-art pulse motor.
Figure 5:
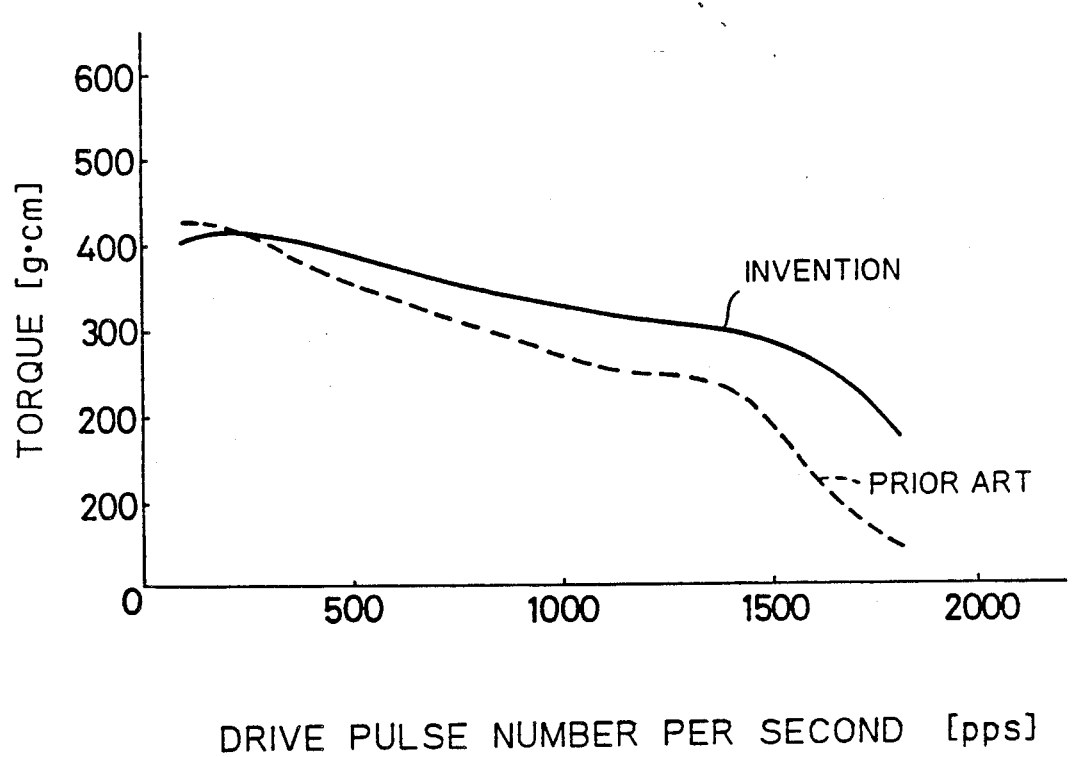
FIG. 5 is a graph showing the torque characteristics of the pulse motor according to the invention.

FIG. 5 is a graph showing, in comparison, the total torque characteristics of the pulse motor according to the invention and the prior art. In this graph, the horizontal axis represents the number of drive pulses for the pulse motor (the unit is the number of pulses per second), and the vertical axis represents the drive torque (the unit is g.cm). The solid line indicates the torque characteristics of the pulse motor according to the invention, while the broken line indicates the torque characteristics of the pulse motor of the prior art as shown in FIG. 2.

It will be clear from this graph that although there is no substantial difference in the low-speed region, in the high-speed region, in particular, a higher torque can be maintained if the slit is provided than if no slit is provided.

The present invention is not limited to the above embodiment.

Figure 6:
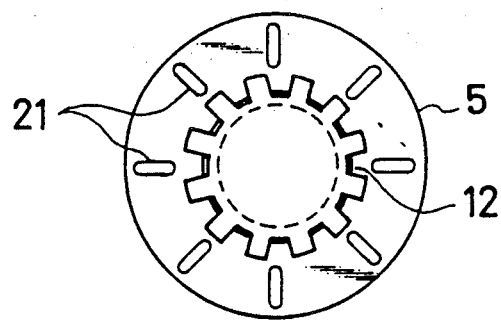
FIG. 6 is a top view showing a variation of the inner yoke of the motor according to the invention.

FIG. 6 is a top view showing a variation of the inner yoke used in the pulse motor according to the invention. This inner yoke 5 is provided with a number of through-holes 21 elongated in a radial direction. The elongation through-holes 21 also have the function of raising the electrical resistance and restraining the eddy current in the circumferential direction.

This embodiment has an advantage over the embodiment shown in FIG. 3 in that the mechanical strength along the circumferential direction is higher. That is, the inner yoke 5 of the embodiment shown in FIG. 3 must have a sufficient rigidity: otherwise it may be deformed when a twisting force is applied to the inner yoke 5. Moreover, when a force to vary the width of the slit 20 is applied, the positions of the magnetic poles 5b and 6b are changed, and the accuracy of the air gap between the magnetic poles 5b and 6b and the rotor 1 may be lowered. The embodiment shown in FIG. 6 is free from such problems.

Figure 7:
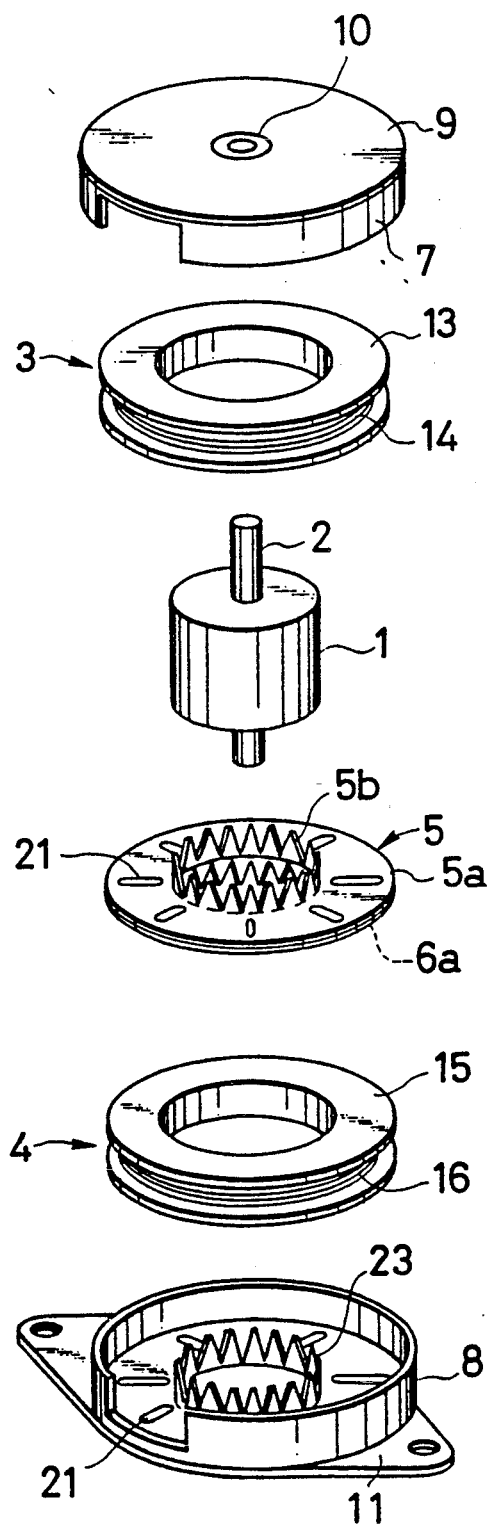
FIG. 7 is an exploded oblique view showing the variation of the pulse motor according to the invention.

FIG. 7 is an exploded oblique view of a variation of a pulse motor employing such an annular yoke. In this embodiment, only the inner yokes 5 and 6, and the outer yokes 7 and 8 are provided with the through-holes 21 and the flange 9 and the mounting plate 11 are not provided with such through-holes. This provides reinforcement and prevents the entry of dust into the motor interior.

Figure 8:
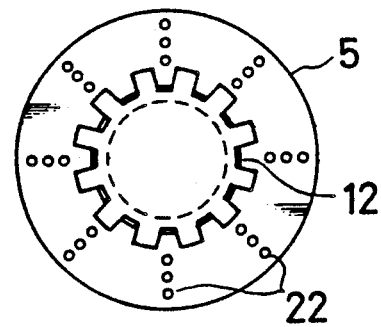
FIG. 8 is a top view showing another variations of the inner yoke of the motor according to the invention.

FIG. 8 is a top view showing another variation of the inner yoke. In this inner yoke 5, a number of circular through-holes arranged in the same direction are provided in place of the elongated through-holes shown in FIG. 6. The effect of increasing the electrical resistance against the eddy current trying to flow in the direction of the circumference can also be increased and the eddy current can be restrained. The yoke with a number of circular through-holes has a higher mechanical strength than the yoke with elongated through-holes.

In a modification, the slit 20 shown in FIG. 3 may have its inner extremity or its outer extremity joined together. In another modification, an insulator or the like is inserted in the slit 20, and bonded with an adhesive to enhance the mechanical strength.

According to the pulse motor of the present invention as described above, when an eddy current is induced in the yoke due to a magnetic flux generated by a drive coil, the eddy current can be effectively restrained, and the eddy current loss is lowered and the drive efficiency of the motor is improved. Moreover, the heat generation due to the eddy current can be prevented and a high-sped drive with a larger current can be achieved without increasing the outer dimension of the motor.

What is claimed is:

1. A pulse motor comprising:
   a rotor having a permanent magnet divided and magnetized along the outer periphery thereof;
   a drive coil surrounding the outer periphery of the rotor;
   an annular inner yoke having a plurality of magnetic poles positioned between said rotor and said drive coil, said inner yoke surrounding the outer periphery of the rotor;
   an annular outer yoke comprising two parts, said outer yoke surrounding the entirety of said rotor, drive coil and inner yoke;
   a flange having a bearing for supporting the rotor, said flange being integrally mounted to one of the two parts of the outer yoke; and
   a motor mounting plate having a bearing for supporting the rotor mounted to the other of the two parts of the outer yoke;
   wherein said inner and at least one of the outer yokes are each provided with at least one aperture for restraining an eddy current.

2. A pulse motor according to claim 1, wherein said at least one aperture intercepts the flow path for the eddy current.

3. A pulse motor according to claim 1, wherein said at least one aperture comprises circular perforations arranged in rows in the direction crossing the flow path of said eddy current.

4. A pulse motor according to claim 1, wherein said at least one aperture comprises an elongated hole extending in the direction crossing the flow path of said eddy current.

5. A pulse motor according to claim 1, wherein said at least one aperture is formed at an appropriate interval portion between adjacent magnetic poles to avoid interception of the magnetic path for the magnetic flux passing through the magnetic poles necessary for the motor drive.

6. A pulse motor comprising:
   a rotor comprising a permanent magnet divided and magnetized along its circumference;
   a rotor shaft centered in the rotor and fixed thereto;
   a pair of drive coils wound on bobbins and surrounding said rotor;
   a pair of annular inner yokes, comprising a pair of annular magnetic plates having a plurality of magnetic poles, said poles being parallel with said rotor shaft, the poles of one of said plates being 90 degrees offset in phase from the poles of the other of said plates and extending in the opposite direction, said poles being disposed between said rotor and said drive coils, said pair of annular yokes being disposed between the drive coils;
   a pair of annular outer yokes surrounding said drive coils, said outer yokes having a plurality of magnetic poles of a like shape and number as said inner yokes, the outer yoke poles being arranged to confront the inner yoke poles such that they extend in the opposite direction and are 180 degrees out of phase with their corresponding inner yoke poles;
   a flange having a bearing for supporting said rotor shaft, said flange being integrally mounted to one of said annular outer yokes;
   a mounting plate having a bearing for supporting said rotor shaft;
   wherein at least said inner and outer yokes, are provided with a plurality of radial apertures formed between two adjacent poles for increasing electrical resistance and restraining an eddy current.

7. The pulse motor of claim 6, wherein said flange and said mounting plate are also provided with a plurality of radial apertures.

8. The pulse motor of claim 6, wherein said plurality of radial apertures are elongated.

9. The pulse motor of claim 6, wherein said plurality of radial apertures are circular.

10. A pulse motor comprising:
    a rotor comprising a permanent magnet divided and magnetized along its circumference;
    a rotor shaft centered in the rotor and fixed thereto;
    a pair of drive coils would on bobbins and surrounding said rotor;
    a pair of annular inner yokes, comprising a pair of annular magnetic plates having a plurality of magnetic poles, said poles being parallel with said rotor shaft, the poles of one of said plates being 90 degrees offset in phase from the poles of the other of said plates and extending in the opposite direction, said poles being disposed between said rotor and said drive coils, said pair of annular yokes being disposed between the drive coils;
    a pair of annular outer yokes surrounding said drive coils, said outer yokes having a plurality of magnetic poles of a like shape and number as said inner yokes, the outer yoke poles being arranged to confront the inner yoke poles such that they extend in the opposite direction and are 180 degrees out of phase with their corresponding inner yoke poles;
    a flange having a bearing for supporting said rotor shaft, said flange being integrally mounted to one of said annular outer yokes;
    a mounting plate having a bearing for supporting said rotor shaft;
    wherein at least said inner and outer yokes, said flange and said mounting plate are provided with at least one radial aperture formed between two adjacent poles for increasing electrical resistance and restraining an eddy current.

11. The pulse motor of claim 10, wherein said at least one radial aperture is a slot.

12. The pulse motor of claim 10, wherein said at least one aperture is elongated.

13. The pulse motor of claim 10, wherein said at least one aperture is circular.

* * * * *